United States Patent [19]

Uemura

[11] 4,257,469
[45] Mar. 24, 1981

[54] RADIAL TIRE HAVING INNER AND OUTER CARCASS LAYERS, CORDS OF OUTER LAYER ARE THINNER RELATIVE TO INNER AND COVER BEAD FILLER

[75] Inventor: Yukihisa Uemura, Nara, Japan

[73] Assignee: The Toyo Rubber Industry Co., Ltd., Osaka, Japan

[21] Appl. No.: 934,513

[22] Filed: Aug. 17, 1978

[30] Foreign Application Priority Data

Aug. 17, 1977 [JP] Japan .................................. 52-99039

[51] Int. Cl.³ .......................... B60C 9/08; B60C 15/00
[52] U.S. Cl. ................. 152/356 R; 152/359; 152/362 R; 152/354 R
[58] Field of Search ..... 152/354 R, 354 RB, 356 RA, 152/355, 357 R, 359, 362 R

[56] References Cited

U.S. PATENT DOCUMENTS

| | | | |
|---|---|---|---|
| 2,317,912 | 4/1943 | Howe | 152/356 |
| 2,874,747 | 2/1959 | Woodall | 152/362 R X |
| 2,990,870 | 7/1961 | Vittorelli | 152/356 |
| 3,498,355 | 3/1970 | Sperberg | 152/357 X |
| 3,548,912 | 12/1970 | Rye et al. | 152/362 R |

Primary Examiner—John T. Goolkasian
Assistant Examiner—Lois E. Boland
Attorney, Agent, or Firm—Koda and Androlia

[57] ABSTRACT

A radial tire for heavy duty vehicles with a plurality of carcass ply layers made of textile cords having end portions of such layers turning round a bead core and having turnup along a bead filler is disclosed. The tire of this invention has its inner layers comprising thick cords, while outer layers comprises thin cords long enough to entirely cover the bead filler, whereby the bead filler is fully in contact with the outer layer made of thin cords.

5 Claims, 2 Drawing Figures

RADIAL TIRE HAVING INNER AND OUTER CARCASS LAYERS, CORDS OF OUTER LAYER ARE THINNER RELATIVE TO INNER AND COVER BEAD FILLER

BACKGROUND OF THE INVENTION

1. Field of the Invention

This invention relates to a radial tire for heavy duty vehicles such as truck, bus and the like, and more particularly to a radial tire having a carcass comprising a plurality of carcass ply layers made of textile cords.

2. Prior Art

A radial tire with the end portions of its carcass ply layers turning round a bead core along a bead filler is known to have a weak area from the edge of a rim flange to the 30 percent point of the distance between the edge of the rim flange and the point where the width of the tire is the largest. Tires tend to have "separation" in this weak area. In this area, the carcass ply layers including their end portions, that turn round the bead core along the bead filler, are in contact with the bead filler. Since the rubber compound used for the carcass ply layers is relatively soft (JIS (Japanese Industrial Standard) hardness 65 and below) and the rubber compound used for the bead filler is relatively hard (JIS hardness 70 and above) the interconnection between the carcass ply layers and the bead filler may not be strong enough. Thus, this area has been suffering from frequent separation.

In addition, the diameter of the textile cords used in the carcass ply layers has affected this tendency. More specifically, relatively thick textile cords are considered to be advantageous for the carcass ply layers, since these thick textile cords would help to reduce the number of the ply to lower the manufacturing cost and to ease the uneven tension in the cords at the inner and outer sides. However, the rubber compound of the carcass ply layers in contact with the bead filler may be damaged because of shearing strain caused by the pressure from the ground; thus, it was not unlikely to have separation in this area.

SUMMARY OF THE INVENTION

Accordingly, it is the primary object of this invention to provide a radial tire for heavy duty vehicles which has excellent resistance against separation around the interconnection between the carcass ply layers and the bead filler.

It is another object of this invention to provide a heavy loading radial tire which is less costly to manufacture.

In keeping with the principles of this invention, the objects are accomplished by a unique structural consideration on the interconnection on the weak area. Such consideration includes firstly the employment of relatively thin textile cords in the outer side of the carcass ply layers by the bead filler, especially in the outer end layer in close contact with the bead filler, and secondly such outer end layer made of the thin textile cords having the longest return along the bead filler whereby the bead filler is covered with and in contact with the layer made of the thin textile cords. These structural features will greatly relieve the undesirable shearing strain in the weak area.

Further, it has been the general practice to have the textile cords arranged as dense as possible from the economical stand point. In this regard, when calculating for the necessary number of plies according to the following formula, Number of plies = requisite strength of ply per inch highest cord end counts per inch × cord tensile strength, it is likely to have some fraction. If the ply layers are all formed by thick cords, it is unavoidable to reduce the cord end counts in order to absorb such a fraction. However, the thicker the cords are, the more rubber compound is needed; moreover, as the cord end counts get lower, still more rubber compound has to be spent. Consequently, such structure is not normally very economical.

On the other hand according to this invention, it has become possible to minimize the amount of rubber compound to be spent by using thin cords in the outer plies to absorb the fraction, thereby cutting the production cost of these tires.

DETAILED DESCRIPTION OF THE INVENTION

Figure 1:
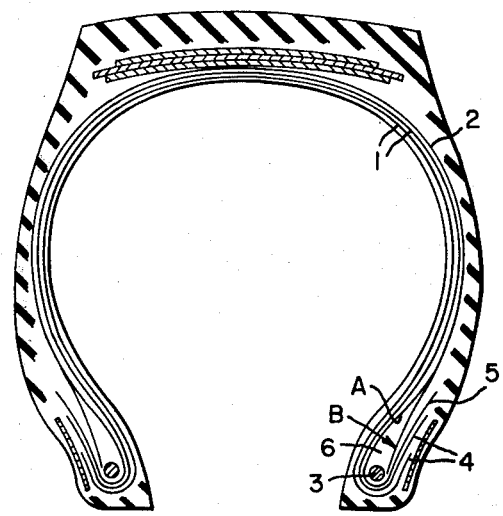
FIG. 1 shows a cross-section view of a radial tire of an embodiment of this invention.
Figure 2:
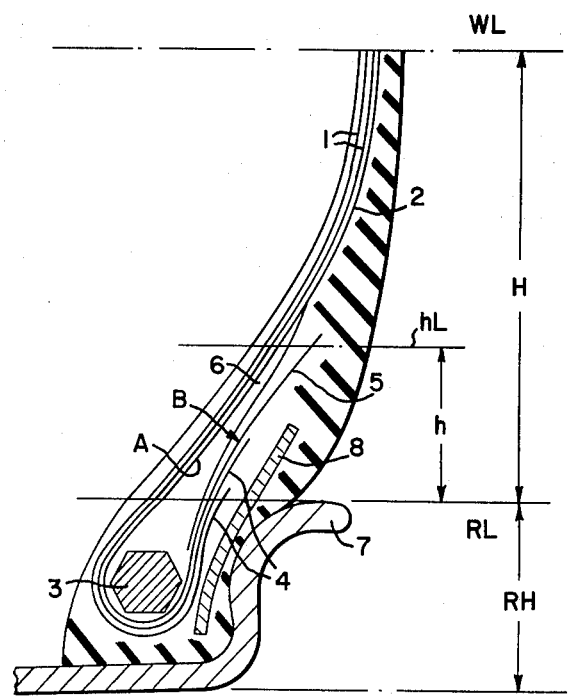
FIG. 2 shows a cross-section view of a part of the tire shown in FIG. 1.

Referring to FIGS. 1 and 2 which show a three-ply radial tire, the two inner layers are made of thick cords 1 and the outer end layer is made of thin cords 2. The density of the cords is expressed in the way of the space ratio as about 30-60 percent, said ratio being reached by the following formula:

Space ratio = (space between cords ÷ cord pitch) × 100. Each end of the layers 1 and 2 are so disposed as to extend to turn round a bead core 3 and return along a bead filler 6. Numeral 4 designates a turnup of the thick cord layers 1 and Numeral 5 designates a turnup of the thin cord layer 2, wherein the turnup 5 is longer than the other returns 4 to fully cover the bead filler 6. Therefore, the contact between the bead filler 6 and the carcass ply layers 1 and 2 is entirely covered with the thin cord layer 2. Numeral 7 designates a rim flange, and Numeral 8 designates a reinforcing layer of metallic cords. Reference character RH designates a height of the rim flange 7 up to a rim flange top line RL, and Reference character H designates a height from the rim flange line RL up to a width line WL of the tire where the width is largest. Reference character h designates a weak area that would have been experiencing frequent separation, said weak area h going up to the 30 percent level of the height H. Reference character hL designates an upper limit of the weak area h.

In the conventional radial tires, intolerable strain takes place during the tire service between the bead filler and the thick cords which are not so flexible as thin cords, thus causing separation of the weak spots such as points A and B shown in FIGS. 1 and 2 for convenience sake. This is particularly typical when the load is heavy.

According to this invention, however, since the outer end layer 2 is made of thin cords and such layer extends to turn round the bead core 3 and have the longer return 5 than the other inner layers, so that the bead filler 6 is thoroughly covered with the layer 2 of thin cords. Due to the better fitness of the thin cord layer 2, the tires of this invention has an excellent resistance against separation.

A series of durability tests has been conducted on the tires of this invention and the prior art and results are shown in the following Table. In those tests, a "10.00 R 20 14PR" radial tire was used with a variety of different types of carcass ply layers. T1 represents a 3-ply radial tire of the prior art, where the cords used therein are of polyester tire cords 1500 d/2/2; in other words, each one of the tire cords is of two strands twisted together which strand further consists of two pieces of polyester 1500 d yarn twisted. T2 represents a 3-ply radial tire of this invention, wherein the inner two layers are made of 1500 d/2/2 tire cords, and the outer end layer is made of 1500 d/2 polyester tire cords or tire cords comprising two pieces of 1500 d polyester yarn twisted.

TABLE

| Test condition Type of tire | | Load: 388 kg Running distance: 15,000 km |
| --- | --- | --- |
| T1: | 1500 d/2/2 cords × 3 plies | Separation at Point A and B |
| T2: | 1500 d/2/2 cords × 2 plies 1500 d/2 cords × 1 ply | No damage |

As can be seen in the Table, the tires of this invention have better resistance against separation in the weak area.

When the load is extremely heavy, it is recommended to use thin cords in the outer layer which thin cords are of less elasticity than the cords to be used in the inner layers. For example, nylon cords 840 d/2 can be used in the outer layer, while polyester cords 1500 d/2/2 is used in the inner layers.

I claim:

1. A radial tire for heavy duty vehicles with a plurality of carcass ply layers comprising inner and outer ply layers made of textile cords whose end portion turn around a bead core and return along a bead filler, wherein:
    one or more inner layers comprise cords,
    one or more outer ply layers comprise cords thinner than said cords of said inner ply layers, and
    at least an outermost ply layer of said outer ply layers has such turnup as to be long enough to cover said bead filler.

2. A radial tire according to claim 1, wherein at least said outermost layer only comprises cords thinner than said inner ply layer.

3. A radial tire according to claim 2, wherein the turnup of the outermost layer is longer than those of the other layers.

4. A heavy loading radial tire according to claims 2 or 3, wherein said tire has three-ply layers and the two inner layers comprise polyester tire cords 1500 d/2/2 and the outer layer comprises of polyester tire cords 1500 d/2.

5. A heavy loading radial tire according to claims 2 or 3, wherein the tire has three-ply layers, and the inner two layers comprise polyester tire cords 1500 d/2/2 and the outer layer comprises nylon tire cords 840 d/2.

* * * * *